(No Model.) 2 Sheets—Sheet 1.
W. E. HAZARD.
MACHINE FOR SHARPENING MATCHER HEADS.
No. 484,094. Patented Oct. 11, 1892.
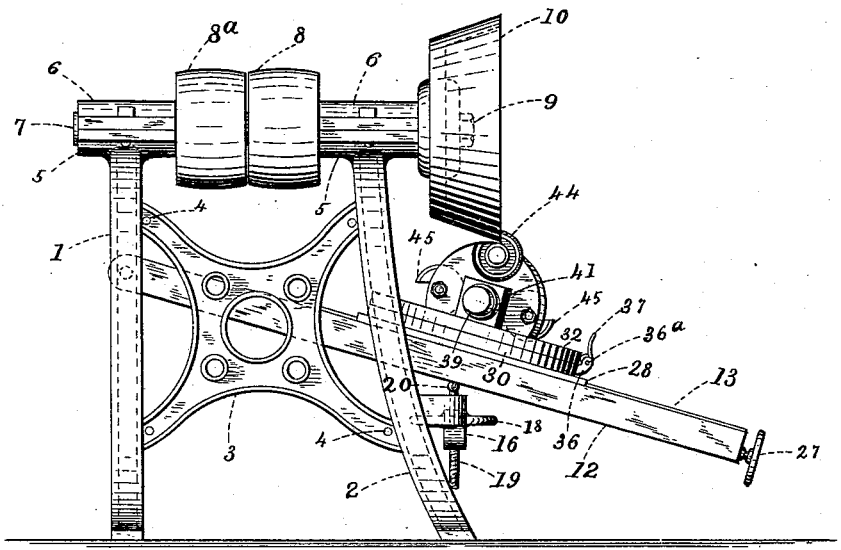
Witnesses.
Jennie M. Caldwell.
Henry C. Ashbery.
Wilbt E. Hazard, Inventor.
By James Sangster
Attorney.

(No Model.) 2 Sheets—Sheet 2.
W. E. HAZARD.
MACHINE FOR SHARPENING MATCHER HEADS.
No. 484,094. Patented Oct. 11, 1892.
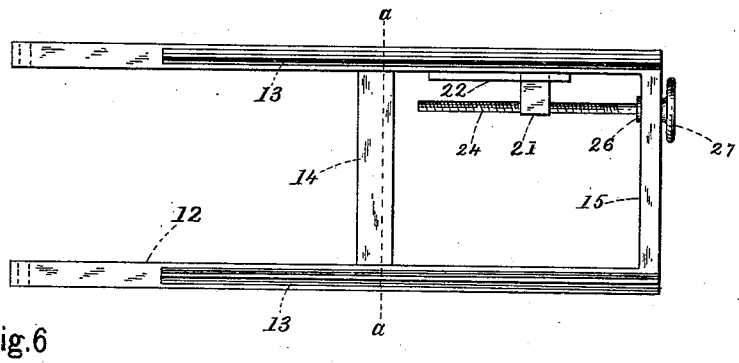
Fig. 5.
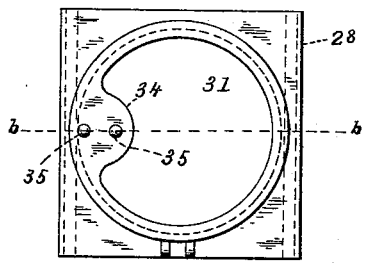
Fig. 6.
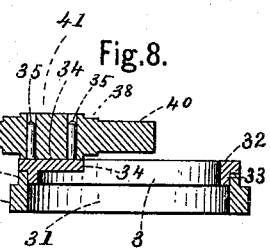
Fig. 8.
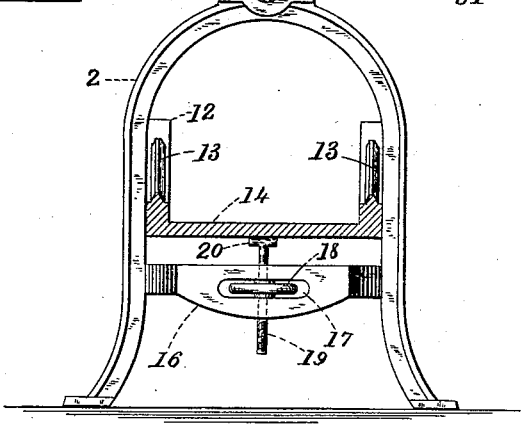
Fig. 7.
Fig. 9.
Witnesses.
Jennie M. Caldwell.
Henry C. Ashbery.
Willet E. Hazard Inventor.
By James Sangster
Attorney.

UNITED STATES PATENT OFFICE.

WILLET E. HAZARD, OF BUFFALO, ASSIGNOR TO HENRY F. McCANN AND WILLIAM S. WICKHAM, OF SALAMANCA, NEW YORK.

MACHINE FOR SHARPENING MATCHER-HEADS.

SPECIFICATION forming part of Letters Patent No. 484,094, dated October 11, 1892.

Application filed April 1, 1892. Serial No. 427,362. (No model.)

*To all whom it may concern:*

Be it known that I, WILLET E. HAZARD, a citizen of the United States, residing in Buffalo, in the county of Erie and State of New York, have invented certain new and useful Improvements in Machines for Sharpening Matcher-Heads or other Similar Cutters, of which the following is a specification.

My invention relates to certain improvements in machines for sharpening matcher, sash, and molding heads or other circular-shaped bits or cutters, and will be fully and clearly hereinafter described and claimed, reference being had to the accompanying drawings, in which—

Figure 1 is a side elevation of the machine complete, showing a matcher-head in position ready to be sharpened. Fig. 2 is a top view of the double reversible arbor upon which the matcher or other head is mounted to be sharpened. Fig. 3 is a front elevation of the machine. Fig. 4 is a cross-section through one side of the pivoted frame upon which the supporting-bed carrying the double reversible arbor rests, showing the dovetail in which the end of the sliding stop-block is moved by a hand-wheel and screw, as will more clearly hereinafter appear. Fig. 5 is a detached plan view of the pivoted frame, showing the V-shaped slideways upon which the arbor-supporting bed rests and is movable. Fig. 6 is a detached plan view of the arbor-supporting bed. Fig. 7 is a front elevation of a portion of the machine, a section being shown through the pivoted supporting-frame in or about line *a a*, Fig. 5, so as to expose its vertical adjusting mechanism below it. Fig. 8 is a vertical central section in or about line *b b*, Fig. 6, cutting through the arbor-supporting bed, the removable ring mounted therein, and the double reversible arbor. Fig. 9 is a central section through the emery-wheel in or about line *c c*, Fig. 3.

The frame-pieces 1 and 2 of the machine are preferably made of cast-iron, as being the most suitable material. They are rigidly secured together by the side frame-pieces 3, fastened thereto by bolts 4 or in any well-known way. At the top the frame is provided with journal-boxes 5, having removable caps 6, and in these boxes the arbor or spindle 7 is mounted so as to turn easily therein. On this arbor or spindle 7 is mounted the driving-pulley 8 and loose pulley 8ª, and at the front or head is secured by a nut 9 in the usual way a cup-shaped sharpening-wheel 10, which is preferably made of emery; but any other suitable material may be used. This emery-wheel, as will be seen, is made in the form of frustum of a cone and is made hollow, so as to leave the grinding-surface of an even thickness, designed to cover the length of the cutter to be ground and not leave anything above the cutter to take the point off.

Pivoted to one of the main frame-pieces 1 by bolts 11 (see Fig. 3) is an inclined frame 12, having V-shaped slideways 13. (See Figs. 1, 3, 5, and 7.) This frame is provided with two cross-bars 14 and 15, preferably formed in one piece with the frame of cast-iron. On the frame 2 is a cross-bar 16, (see Fig. 7,) having an opening 17 through it, and within the opening 17 is placed (horizontally) a hand-wheel 18, having a central hole provided with an inside screw-thread, and through it is passed a corresponding screw-threaded vertical rod 19. At the top of the rod 19 is a small cross-piece 20, which rests up against the under side of the cross-bar 14.

From the above description it will be seen that the pivoted frame 12 may be adjusted either up or down by turning the hand-wheel 18 in the direction it is required to adjust the frame.

On the frame 12 is what may be called a "stop-block" 21. This block 21 is made movable along the inner side of the frame 12 by means of dovetail slideways 22 and the dovetail portion 23 of the block. It is moved back or forth by the screw-rod 24, which passes through the screw-hole 25 in the block. (Shown in Fig. 4.) The opposite end of the screw-rod 24 passes through the cross-bar 15 and is provided on the inside of said bar with a collar 26. (See Fig. 5, where this is shown.) On the rod 24, outside of the cross-bar 15, is rigidly secured a hand-wheel 27. By means of this hand-wheel 27 the stop-block may be moved either back or forward. Its object will be described farther on.

On the slideways of the frame 12 is mounted a square bed piece or carriage 28, having grooves on its under side adapted to fit the V-shaped slideways on the pivoted frame 12, so as to be movable either way thereon. On the under side of the bed-piece 28 is a downwardly-projecting lug 29 (shown in Fig. 3) for the purpose of limiting the forward movement of the bed-piece 28 when it comes in contact with the stop-block 21, so that the limit of the forward movement of the bed-piece 28 will be at the point to which the stop-block may be adjusted. The object of this construction is to provide the means for locating and limiting the distance the matcher-head shall be moved forward, thereby determining the bevel or incline at which the cutters are to be ground. On the top of the supporting bed-piece 28 is an upwardly-projecting rim 30, forming the upper part of the carriage, and in the center is a circular opening 31. Above the rim 30 is a removable ring 32, having a downwardly-projecting portion 33, which fits into the opening 31, so that the ring 32 may be turned therein. On one side of this ring 32 is an enlarged portion 34, having two vertical pins 35 rigidly secured thereto. (See Figs. 3 and 8.) Projecting from one side of the rim 30 are two projecting lugs or ears 36, between which is pivoted by a pin 36ª a cam-lever 37, having an eccentric-shaped cam, so that by turning it up, as shown in Fig. 1, the the upper or movable ring 32 will be rigidly fastened at any desired point, and by turning said lever down the ring 32 will be released, so that it can be easily turned in either direction in its seat.

The object of the vertical pins 35 is to receive and hold a double arbor 38. This arbor 38 is provided with two cylindrical portions or spindles 39 and 40 of different diameters, so as to receive matcher-heads or other cutter-heads. Centrally between the two cylindrical portions or spindles 39 and 40 is a substantially-square portion 41, having two holes 42 and 43, adapted to fit over the vertical pins 35. By this construction either end of the arbor may be turned outward by lifting it off from the vertical pins, then reversing and replacing it, thus adapting it for cutter-heads of different-sized bores.

The operation of the machine is as follows: Place the matcher or other cutter head on the spindle (the spindle 40, for instance) and put the arbor in position to grind the cutters 44 on the under side of the head. The carriage being turned and secured at the desired point to present the cutters at the proper angle to be ground, shove the carriage forward until the lug 29 strikes the stop-block 21. This stop-block is moved backward or forward by means of the hand-wheel, as hereinbefore mentioned, and the point to which it is adjusted determines the bevel or incline at which it is desired to grind the cutters. The head is then turned on the spindle until the cutter comes in contact with the grinding-wheel. Now force the cutter against it until it is sufficiently ground. To grind the opposite cutter, draw the carriage back and turn the head on the spindle so as to bring the cutter in position and proceed as before. To grind the cutters 45 on the upper side, loosen the cam-lever 37 and turn the ring 32 with the head around to the proper position. To grind the correct angle on the cutter, tighten the cam-lever and repeat the same operation as above described. The cutters on the other head are ground in the same manner, with the exception that the ring 32 is turned half-way around. To accommodate the different-sized diameter of heads, the pivoted slideway-frame is made adjustable so as to be raised or lowered by the hand-wheel 18. As the wheel wears away it does not change the grinding-face, but remains the same until entirely worn out, which is a great advantage over the ordinary flat wheel heretofore used for grinding.

It will be noticed that the incline of the grinding-wheel is important, because the throats of the cutters are less than a right angle. Consequently an ordinary right-angled cup or solid wheel would not answer the purpose. It will also be obvious that a horizontal slideway-frame would work well with a conical-shaped wheel, as it would not cut down into the throat of the cutter, because it would have to cut away a portion of the head to do so, as the upward curve of the head from the throat to the cutter would in a majority of cases be in the way.

The pivoting of the slideway-table on an incline so as to be substantially parallel, or nearly so, with the periphery of the conical grinding-wheel is therefore very important.

In some cases where the matcher-heads are all of the same bore either one of the portions 39 or 40 may be dispensed with, one only in such cases being required.

I claim as my invention—

1. In a machine for grinding matcher or other heads, the combination of a carriage mounted on slideways pivoted to the frame of the machine for the purpose of carrying the cutter-heads to or from the grinding-wheel, with two vertical pins projecting up from said carriage, and a reversible double arbor removably mounted on said pins for receiving and carrying cutter-heads of different-sized bores to or from the grinding-wheel and operating the cutter-head while its cutters are being ground, substantially as described.

2. In a machine for grinding the cutters of matcher or other cutter heads, the combination, with the slideway-frame upon which the carriage moves, of a slideway on the inner side of said frame, a stop-block secured in said slideway so as to be movable back and forth, a screw passing through said block and having its outer end secured so as to turn in the end cross-bar of the slideway-frame, a hand-wheel for turning it, and a lug projecting down from the carriage, whereby the forward movement of the carriage carrying the cutter-head may be adjusted and limited, substantially as described.

3. In a machine for grinding the cutters of matcher or other cutter heads, a carriage adapted to slide to or from the grinding-wheel and carrying the cutter-heads, consisting of a substantially square base, an upward-projecting circular rim 30, a ring constructed to fit in and turn in said rim, a means on said ring for receiving and holding the cutter-head, and a pivoted cam-lever for holding said ring at any part of its rotary adjustment, for the purposes described.

WILLET E. HAZARD.

Witnesses:
JENNIE M. CALDWELL,
JAMES SANGSTER.